July 26, 1932.  J. W. WHITE  1,868,781
WHEEL
Filed Jan. 9, 1924
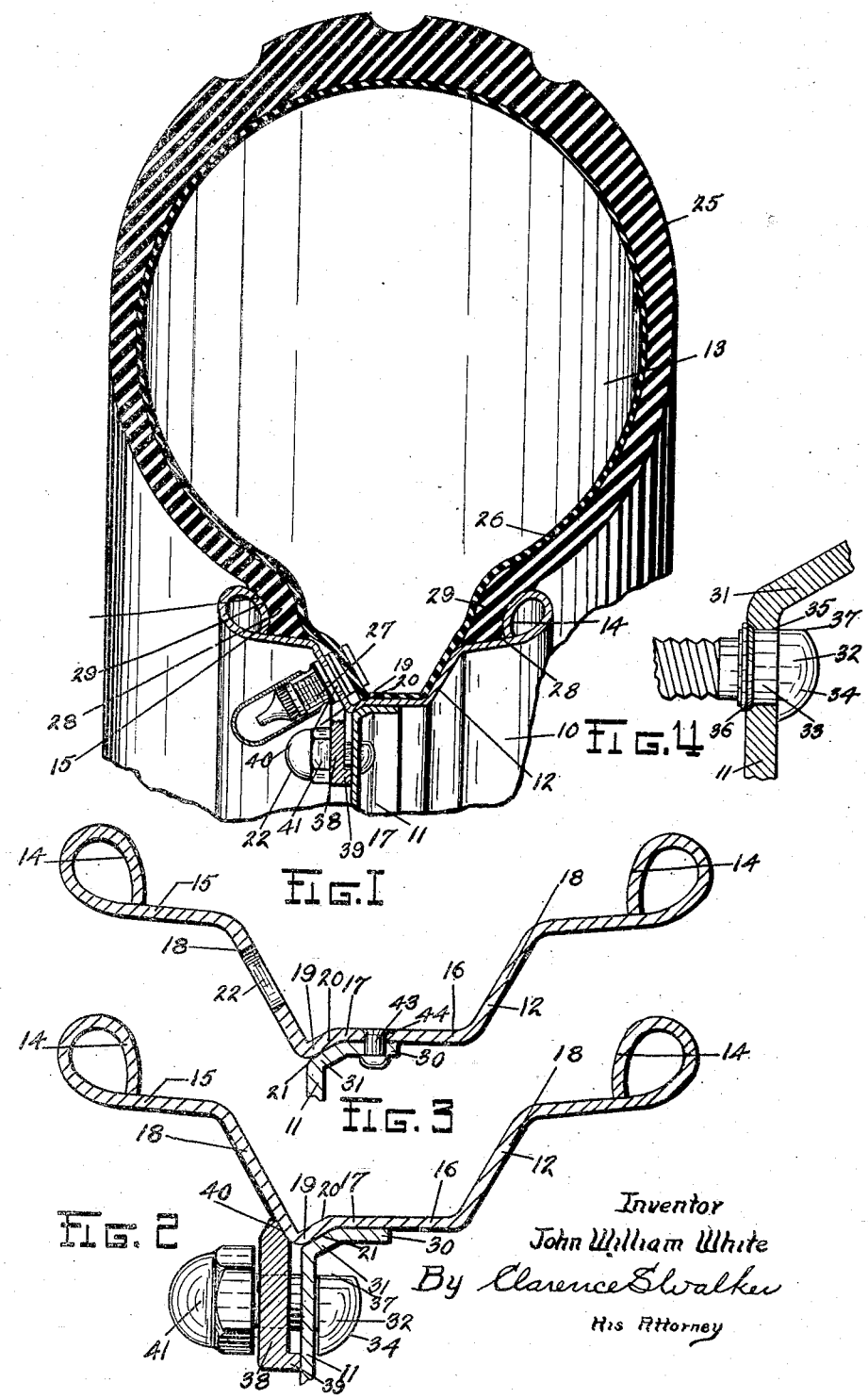

Patented July 26, 1932

1,868,781

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed January 9, 1924. Serial No. 685,216.

This invention relates to an improvement in wheels, and more particularly in wheels of the disc type in which the rim is mounted upon the wheel disc in a new and novel manner.

The primary object of this invention is to provide in a disc wheel a rim which may be either rigidly or demountably secured upon the wheel disc, the disc being treated differently in the process of formation in accordance with the manner in which the rim is to be mounted thereon.

A further object of this invention resides in the formation of the wheel disc for a wheel of this type by a single operation when the rim is to be rigidly secured by rivets or other suitable means upon the disc and by a second operation when the rim is to be demountably secured upon the disc and held in position by suitable clamping means.

Another object of this invention resides in the provision in a rim of the drop center type of a valve stem opening through the outer side of the rim instead of through the base of the rim, as done prior to this invention, thus eliminating the necessity of manipulating the disc to accommodate the stem.

Still another object of this invention is the provision in a wheel of the disc type having a drop center rim of a wheel disc with an inwardly projecting annular flange on which the base of the rim is received, the base having an annular head which, when the disc and rim are assembled, bears against the outer face of the disc, said rim being either rigidly secured to said flange or demountably secured by clamping means carried by said wheel disc and bearing against the outer face of said bead.

Other objects will appear from an examination of the following description taken in connection with the drawing, which form a part thereof, and in which Fig. 1 is a sectional view of one embodiment of this invention showing the rim demountably carried upon the disc;

Fig. 2 is a sectional view on a larger scale of the embodiment shown in Fig. 1;

Fig. 3 is a view similar to Fig. 2, showing the rim rigidly attached upon the disc; and Fig. 4 is a detail view.

Referring to the drawing, the numeral 10 is used to designate a wheel of the disc type embodying one form of this invention, a portion of the outer periphery of the wheel being shown. This wheel includes a wheel disc 11 and a rim 12 which receives a tire 13.

In the drawing the rim 12 illustrated is of the drop center type having tire holding flanges 14, tire bead receiving portions 15 and a depressed center 16 comprising the rim base 17 joined to the bead receiving sides 18. On the inner side of the base 17 is formed a continuous annular bead 19, having an inner face 20, and an outer face 21. This bead may be formed, as here shown, by depressing the rim base or as shown in my Patent 1,473,368, November 6, 1923.

An opening 22 for the tire valve stem is provided in the outer side 18 of the rim instead of through the rim base as is the usual custom. This eliminates the manipulation of the wheel disc or the use of auxiliary valve adapter previously required when the stem was passed through the rim base, and moreover so locates the valve stem that the tire can be inflated or deflated from the outer side of the wheel without difficulty.

The tire comprises a casing 25 and an inner tube 26 which carries the valve stem 27. The casing 25 terminates in beads 28, which, when the tire is in position, rest upon the rim portions 15 and has shoulders 29 which rest upon the flanges 14 whereby, in case the tire becomes deflated, the casing is supported by the flanges and the wheel can, if necessary, be run without any likelihood of the tire leaving the rim.

The disc 11 has at its periphery an inwardly projecting annular flange 30 which is united to the body of the disc by an inclined surface 31. The disc is treated by a stamping operation in which the flange 30 is formed at a single operation. A restamping or coining of the disc will reduce the diameter of the flange 30 slightly, a feature of which advantage is taken in this invention.

There are two types of disc wheels on the market, those in which the rim is demountably secured upon the disc (see Figs. 1 and 2), and those in which the rim is rigidly secured to the disc (Fig. 3). Obviously, the disc and rim have a closer surface engagement in the second type than in the first, and consequently in the former, the flange 30 may be formed by a single operation, while in the latter a further stamping or coining operation is required in order to provide the clearance between rim and flange necessary to permit the easy mounting or demounting of the rim.

In the demountable rim type of disc wheel shown in Figs. 1 and 2, the rim is seated upon the disc with the face 20 of the bead 19 resting against the inclined surface 31 of the disc. Projecting from the disc are a plurality of bolts 32 having a squared portion 33 adjacent the head 34 which fits in squared holes 35 in the disc. The outer edge of each hole 35 is tapered and the adjacent portion of the bolt is peened over at 36 to hold the bolt secured in the disc. The outer edge of the head 34 is cut away as to 37 in view of the formation of the flange 30.

Carried by the bolts 32 are the clamping means 38 here shown in the form of a continuous clamping ring. This ring is made of a mill section having a foot 39 laterally projecting from and adjacent to its inner edge and an inclined face 40 at its outer edge. The foot rests against the outer face of the disc 11 and the inclined face engages the face 21 of the bead. Suitable nuts 41 engaging the bolts 32 are provided to secure the clamping means in position. A series of lug clamps may be used if preferred.

When the type shown in Fig. 3 is made, the diameter of the disc flange 30 is such that the rim fits snugly thereover. The surface 31 rests against the face 20 of the bead in order to insure proper alinement and the rim is secured to the flange by rivets 43 or other suitable means.

It will be noted that the same rim is employed in both types except for the countersunk holes 44 and that the same disc may be used, the difference being in the restamping or coining above mentioned in the demountable rim type. Thus it is possible to make up the rims in quantity and to have on hand a stock of discs with the flanges of the larger diameter. If an order is received for non-demountable rim wheels, the rims and discs are quickly assembled, holes 44 and 45 drilled in the rim bases and disc flanges and the rims and discs are riveted in place. Should, however, an order be received for demountable rim wheels, the discs are restamped or coined to reduce the diameter of the flange, the holes 35 being formed, preferably by the same restamping or coining operation, and the bolts 32 secured in position. The rim is now mounted upon the disc and held in place by the clamping means 38, fixed on the bolts 32 by the nuts 41. The tires 13 having been applied to the rims with the valve stems 27 through the holes 22, the wheels are now ready for installation upon the car or for shipment.

While one embodiment only of this invention has been shown and described, applicant is not limited thereto since it is obvious that other embodiments can be made without departing from the spirit and scope of this invention as set forth in the following claim.

Having thus set forth my invention what I claim as new and for which I desire protection by Letters Patent is:

The combination with a disk wheel having a rearwardly and outwardly inclined peripheral flange and a flat portion adjacent said peripheral flange, of bolts projecting through said flat portion, a demountable tire carrying rim having tire engaging flanges and a relatively deep inwardly projecting central portion, said relatively deep central portion being adapted to contact with the peripheral flange of the wheel body, clamps arranged upon said bolts and maintaining said rim in contact with said peripheral flange and nuts upon said bolts for maintaining said clamps in locked position.

In testimony whereof I have affixed my signature.

JOHN WILLIAM WHITE.